March 10, 1970 — R. O. KELLAM, JR — 3,500,369
PULSE WIDTH ERROR DETECTOR
Filed June 27, 1966

INVENTOR.
RICHARD O. KELLAM JR.
BY
ATTORNEY

United States Patent Office 3,500,369
Patented Mar. 10, 1970

3,500,369
PULSE WIDTH ERROR DETECTOR
Richard O. Kellam, Jr., Escondido, Calif., assignor to Singer-General Precision Inc., Little Falls, N.J., a corporation of Delaware
Filed June 27, 1966, Ser. No. 560,688
Int. Cl. G08b *21/00;* H03k *5/20*
U.S. Cl. 340—248                                2 Claims

ABSTRACT OF THE DISCLOSURE

A monostable multivibrator is adjusted to produce output pulses of predetermined pulse width in response to the introduction of the leading edges of the pulses being sampled. Both the output of the multivibrator and the sampled pulses are fed as inputs to an OR gate which, in turn, is coupled to an inverter and then to a silicon controlled rectifier. The OR gate triggers the rectifier whenever the pulse width of the sample signal decreases below that of the multivibrator's output. In order to give an indication when the sampled signal pulse width exceeds that of the multivibrator output, an AND gate is provided responsive to the sample signal and the multivibrator's output and adapted to trigger a second silicon controlled rectifier whenever there is lack of coincidence between the input signals applied to the AND gate.

---

This invention relates to an electronic circuitry, and more particularly to a novel and improved pulse width error detector which is capable of detecting and indicating variations in pulse widths of the input signal.

The circuit described herein is useful in detecting whether a sample frequency has changed from a given or desired frequency. Such sample frequency might be a clock signal on the rotating memory drum which may be sampled by coupling the read transducer to the circuitry described herein, to provide an indication whenever the rotational velocity of the memory has changed. Similarly, the slew rate of an analog module motor may be tested for velocity fluctuations.

It is one object of this invention to provide a novel and improved circuit for detecting a frequency which is different than a desired frequency.

Another object of the invention is to provide novel and improved circuitry for determining the frequency error of a pulse-producing means.

Another object of the invention is to provide a new and improved circuit which is capable of detecting variations in pulse widths of pulse generating apparatus.

Briefly described, the invention comprises a monostable multivibrator which is adjusted to produce output pulses of the desired pulse width upon the introduction of the leading edges of the pulses to be sampled. The sample pulses and the multivibrator pulses are connected to gating means which compares the pulse widths of its two inputs and triggers a silicon controlled rectifier indicator circuit whenever the pulse width of the sample signal is dissimilar to the desired pulse width produced by the multivibrator.

In the drawings, which illustrate a preferred embodiment of the invention:

Figure 1:
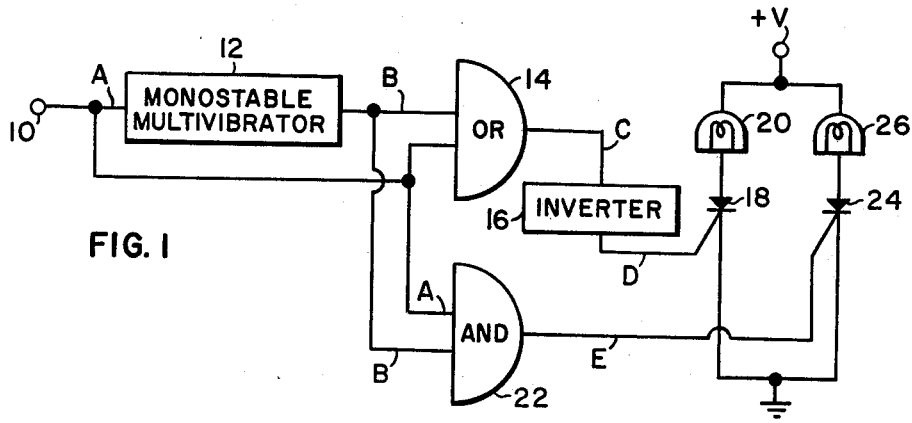
FIGURE 1 is a block diagram illustrating the various components of the circuit in block form.

Turning now to a more detailed description of the invention, an input terminal 10 receives a sample pulse signal, such as a clock signal from a rotating memory device, or a selected digit line of an analog-to-digital encoder, or any type of frequency generating apparatus in which the frequency is to be checked for errors. Coupled to terminal 10 is a monostable multivibrator 12. Multivibrator 12 is a typical and well known one-shot multivibrator which produces an output square wave in response to the leading edge of an input signal, such as a square wave pulse. Multivibrator 12 will produce a square wave output having a pulse width which is determined by the internal parameters of the multivibrator. The output of multivibrator 12 is coupled to OR gate 14, which also receives, as a second enabling input, the sample signal appearing on terminal 10. The output from OR gate 14 is connected to an inverter 16, the output of which is directly coupled to the trigger electrode of a silicon controlled rectifier 18.

The output of multivibrator 12 is also connected to an AND gate 22 which also receives, as an enabling input, the sample signal from terminal 10. The output of AND gate 22 is connected to the trigger electrode of silicon controlled rectifier 24. The cathodes of silicon controlled rectifiers 18 and 24 may be coupled to ground, and the anodes may be coupled to a source of positive voltage, through indicator lamps 20 and 26, respectively. Indicator lamps 20 and 26 may be a standard type of indicator which operate at a voltage which is dependent upon the voltage appearing across the indicator circuit. Silicon controlled rectifier 18 will cause indicator lamp 20 to become operative when OR gate 14 detects a sample signal having a pulse width which is narrower than the desired pulse width produced by multivibrator 12. Similarly, indicator 26 will be illuminated when AND gate 22 detects a sample signal having a wider pulse width than the desired pulse width produced by multivibrator 12.

OPERATION

Figure 2:
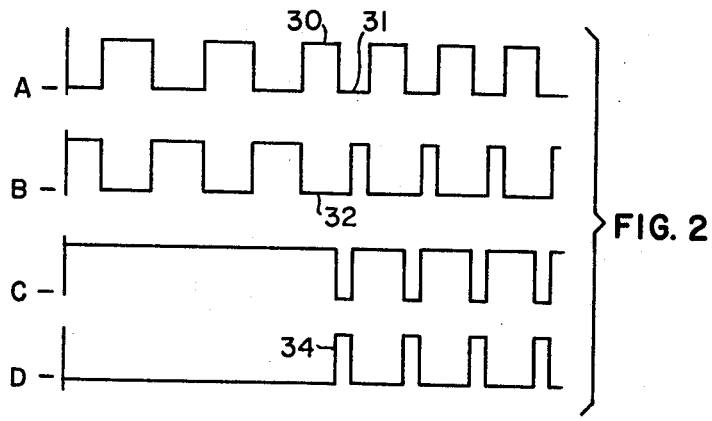
FIGURE 2 is a diagram illustrating the waveforms appearing at various points in the circuit of FIGURE 1 when a sampled pulse width is diminished from the desired pulse width.

Referring now to FIGURE 2, the waveform A may be a typical sample signal applied to input terminal 10. For the purpose of explanation of the operation of the circuit, waveform A is shown to be of constant pulse width during the first two cycles, and then the pulse width is decreased, or the frequency increased, at pulse 30. The circuitry described herein will indicate the instant that the input signal A decreases in pulse width.

Signal A is presented to monostable multivibrator 12, which, as previously explained, produces an output pulse when activated by the leading edge of an input pulse. A monostable multivibrator is capable of producing two outputs, one of which is in phase with the input signal, and one of which is inverted. Multivibrator 12 is connected so that it produces an output signal B, as a negative-going constant-width pulse, which is initiated upon the positive-going leading edge of the input signal. This output pulse from multivibrator 12 is then applied as one input to an OR gate 14, which receives its second input directly from input terminal 10. OR gate 14, therefore, compares input signal A with the constant pulse width output signal B from multivibrator 12, and produces a negative-going output signal C whenever portions of signals A and B have low level coincidence. As shown in FIGURE 2, all low level states of waveform B are of equal pulse width and waveform A is shown to produce a narrowing pulse width at pulse 30. As pulse 30 is completed and drops to its negative-going position 31, it can be seen by comparing pulse position 31 of input signal A with pulse 32 of signal B that there is a time that neither pulse A nor pulse B is positive. During this coincident low level time, the output signal C of OR gate 14 will drop to the zero value. Upon presentation of this signal to inverter 17, the drop in signal C will be inverted into a positive pulse 34, and the signal D containing this pulse 34 is introduced to the trigger electrode of silicon controlled rectifier 18, which is driven into conduction by the presence of the positive pulse. The conduction of rectifier 18 will close the indicator ciricuit and the lamp 20 will indicate that the pulse width of input signal A has been reduced, or, conversely, the frequency has been increased.

Figure 3:
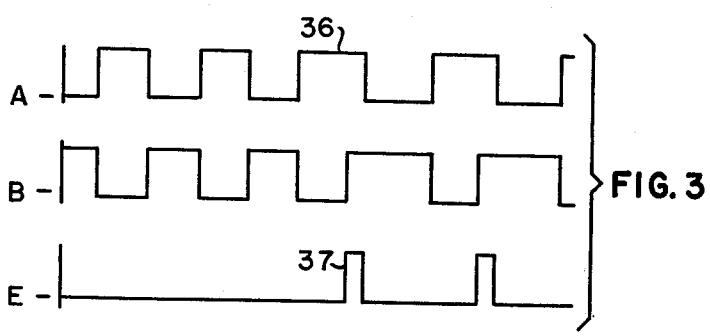
FIGURE 3 is an illustration of the pulses appearing at various positions in FIGURE 1 when the pulse width of the sample signal exceeds the desired pulse width.

The indicator circuit comprising AND gate 22, silicon controlled rectifier 24, and indicator 26 produce an indication whenever input signal A has an increasing pulse width, or decreasing frequency. FIGURE 3 illustrates the input signal A which appears at terminal 10, the monostable multivibrator output signal B and the resulting signal E which triggers the rectifier 24. It can be seen from inspection of FIGURE 3, that signal A is shown to have the desired pulse width for the first two cycles and increases in pulse width at pulse 36. As noted above, the output of multivibrator 12 produces negative-going pulses of constant pulse width upon the introduction to the multivator of the leading edge of the input signal. Pulses A and B are introduced to AND gate 22, which will become enabled only when all of the inputs are positive. It can be seen that pulses A and B are in opposition and AND gate 22 is disabled until the lengthened pulse 36 appears. At that instant a positive pulse 37 will be produced as an output signal E from AND gate 22. This pulse, because it is positive, will be adequate to drive rectifier 24 into conduction, thereby completing the indicator circuit between the source of voltage and ground.

It can be seen that the circuit described will detect the existence of both narrower and wider pulses than those desired. It is apparent that the circuit may be divided so that it could be used to detect only narrowing or only widening pulses.

Having thus described the preferred embodiment of the invention, what is claimed is:

1. A pulse width error detector comprising:
   pulse producing means for providing a pulse signal of predetermined pulse width, said pulse producing means having an input for receiving a sample input signal normally having pulse widths equal to that of said predetermined pulse width and an output for providing said predetermined width pulse signal in phase opposition to said sample signal,
   OR gate means having one of its inputs coupled to said pulse producing means output and another of its inputs coupled to receive said sample signal whereby said OR gate means is adapted to produce a negative going pulse in response to coincidence of negative portions of the pulse producing means output signal and said sample signal,
   inverter means coupled to said OR gate means for producing a positive enabling pulse in response to a negative going output pulse from said OR gate means,
   first switch means coupled to said inverter means and being responsive to said enabling signal therefrom for energizing an indicator means to indicate said coincidence between negative portions of said sample signal pulses and said predetermined pulse width signals thereby obtaining an indication that said sample input signal has changed to a greater frequency having narrower pulse widths than said predetermined pulse width,
   AND gate means having one of its inputs coupled to said pulse producing means output and another of its inputs coupled to receive said sample signal whereby said AND gate means is adapted to produce a positive going pulse in response to coincidence of positive portions of the pulse producing means output signal and said sample signal, and
   second switch means coupled to said AND gate means and being responsive to said positive pulse therefrom for energizing second indicator means to indicate said coincidence between positive portions of said sample signal pulses and said predetermined pulse width signals thereby obtaining an indication that said sample input signal has changed to a lower frequency having wider pulse width than said predetermined pulse width.

2. A pulse width error detector in accordance with claim 1 wherein said pulse producing means includes a monostable multivibrator, and
   said first and second switch means comprise a pair of silicon-controlled recitifiers, respectively.

References Cited

UNITED STATES PATENTS

| | | | |
|---|---|---|---|
| 2,982,943 | 5/1961 | Isaacson et al. | |
| 2,984,789 | 5/1961 | O'Brien | 307—234 XR |
| 3,167,716 | 1/1965 | Williams et al. | 328—59 XR |
| 3,230,461 | 1/1966 | Dix et al. | 328—112 |
| 3,346,855 | 10/1967 | Bishop | 340—248 |

OTHER REFERENCES

IBM Tech. Discl. Bulletin; Delay Pulse Generator, by Stevenson & Norton, vol. 4, No. 8; January 1962.

JOHN W. CALDWELL, Primary Examiner

DANIEL MYER, Assistant Examiner

U.S. Cl. X.R.

307—234; 328—112